United States Patent
Maeki et al.

(10) Patent No.: US 11,403,592 B2
(45) Date of Patent: Aug. 2, 2022

(54) INVENTORY COUNT METHOD AND ASSET MANAGEMENT SYSTEM

(71) Applicant: Hitachi, Ltd., Tokyo (JP)

(72) Inventors: Akira Maeki, Sunnyvale, CA (US); Manish Gupta, Sunnyvale, CA (US); Yuki Watanabe, San Jose, CA (US); Chandrasekar Venkatraman, Saratoga, CA (US); Nam Huyn, Milpitas, CA (US); Ravigopal Vennelakanti, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 538 days.

(21) Appl. No.: 16/454,898

(22) Filed: Jun. 27, 2019

(65) Prior Publication Data
US 2020/0410431 A1    Dec. 31, 2020

(51) Int. Cl.
*G06Q 10/08* (2012.01)
*G01S 19/13* (2010.01)
*H04N 5/232* (2006.01)

(52) U.S. Cl.
CPC ............ *G06Q 10/087* (2013.01); *G01S 19/13* (2013.01); *H04N 5/23203* (2013.01); *H04N 5/23299* (2018.08)

(58) Field of Classification Search
CPC ...... G06Q 10/087; G06Q 10/08; G01S 19/13; H04N 5/23299; H04N 5/23203; H04N 5/23206; H04N 5/23222; H04N 5/232
USPC .......................................................... 705/28
See application file for complete search history.

(56) References Cited

U.S. PATENT DOCUMENTS

| | | | | |
|---|---|---|---|---|
| 5,565,858 A * | 10/1996 | Guthrie | ............... | G01S 19/14 340/10.33 |
| 5,948,189 A * | 9/1999 | Parish, II | ............ | B29C 66/0242 156/64 |
| 8,314,704 B2 * | 11/2012 | Cova | ............... | G06Q 10/0833 340/572.1 |
| 9,933,523 B2 * | 4/2018 | Fitzgerald | ............. | G01S 19/426 |
| 10,043,154 B2 * | 8/2018 | King | ............... | B66F 9/186 |
| 10,187,616 B2 * | 1/2019 | Shondel | ............... | H04N 7/185 |
| 10,460,170 B1 * | 10/2019 | Adler | ............... | G06T 17/05 |
| 10,460,179 B2 * | 10/2019 | Kim | ............... | G06K 9/6211 |
| 2011/0148589 A1 * | 6/2011 | Johnson | ............... | G06Q 10/087 340/10.1 |
| 2011/0153614 A1 * | 6/2011 | Solomon | ............... | G06Q 10/087 707/740 |

(Continued)

FOREIGN PATENT DOCUMENTS

| | | |
|---|---|---|
| JP | 2001-88912 A | 4/2001 |
| JP | 2014-44674 A | 3/2014 |

*Primary Examiner* — Andrew Joseph Rudy
(74) *Attorney, Agent, or Firm* — Procopio, Cory, Hargreaves & Savitch LLP

(57) ABSTRACT

Example implementations described herein are directed to an asset management system configured to facilitate real-time inventory recognition with image analysis tagged with positional information. The example implementations described herein also provide the method and process to improve the accuracy of the pipe detection for counting with various approaches. Referring the expected number of the pipes, example implementations utilize the pipe detection algorithm, as well as the bounding box of the pipe stack, use the knowledge of the physical size of the pipe stack, and analyze a pipe stack from the images of two directions at the end.

15 Claims, 13 Drawing Sheets

(56) References Cited

U.S. PATENT DOCUMENTS

2018/0356964 A1\* 12/2018 Morris .................... G06F 3/167
2020/0104790 A1\* 4/2020 Chung .................... G06F 16/29

\* cited by examiner

| Image ID | GPS position | Direction | Distance | Image data | Timestamp |
|---|---|---|---|---|---|
| Image1 | GPS1 | DIR1 | DIS1 | IMG1 | TIME1 |
| Image2 | GPS2 | DIR2 | DIS2 | IMG2 | TIME2 |
| ⋮ | ⋮ | ⋮ | ⋮ | ⋮ | ⋮ |

FIG. 11(a)

| Pipe stack ID | GPS coordinates | Expected Count | Configuration Type | Threshold Parameters | Timestamp |
|---|---|---|---|---|---|
| PIPE1 | GPS1 | COU1 | CON1 | THRE1 | TI1 |
| PIPE2 | GPS2 | COU2 | CON2 | THRE2 | TI2 |
| ⋮ | ⋮ | ⋮ | ⋮ | ⋮ | ⋮ |

FIG. 11(b)

| Pipe stack ID | Transaction | Timestamp |
|---|---|---|
| PIPE1 | TRAS1 | TIM1 |
| PIPE2 | TRAS2 | TIM2 |
| ... | ... | ... |

FIG. 11(c)

INVENTORY COUNT METHOD AND ASSET MANAGEMENT SYSTEM

BACKGROUND

Field

The present disclosure is generally directed to inventory management, and more specifically, to facilitating an inventory counting method, computer program and asset management system.

Related Art

Related art implementations address pipe counting and asset management for pipe inventory in various ways.

In one example related art approach, an identifier (ID) is assigned to each pipe in a pipe stack. The examples for the ID can include bar code, Quick Response (QR) code, or Radio Frequency ID (RFID) attached at a casing of a pipe. Such related art implementations identify the data related to the pipes. However, it takes time to read all the IDs, there are extended costs for tag itself and as well as for tagging and reading the IDs, the rate of successful recognition is not high enough in a metal rich condition, and the casing can also be replaced when the length is adjusted and be disposed at wells.

Another related art approach uses video analytics to capture the cross section of the pipes to count the number of the pipes. There are many well-known algorithms to detect the circle but the error rate will be affected by the lighting and the occlusion, because such pipes are typically placed outside without any particular alignment.

SUMMARY

Example implementations described herein involve the extraction of the expected number of the inventory stock based on the position of the image capture. The position can be defined by any location providing implementation (e.g., global positioning system (GPS)) in accordance with the desired implementation. Further, the direction of the image capture from the image capture device (e.g., camera), is associated with the position or direction of the inventory from the image capture device. Example implementations described herein can be applied to large assets such as oil production pipes that are stored on vast tracts of land such as a yard, whereas typical inventory is taken place in a warehouse. The inventories at a yard involve an open environment outdoors, whereas inventories at a warehouse are in a fixed environment indoors in which many parameters like lighting, shades, and angle of the image capture are controllable. Example implementations described herein are directed to facilitating implementations for both indoor and outdoor implementations.

Example implementations described herein can be applied to pipe count for oil production and for pipe lines, which are typically stored outside, but it is not limited to the products or environment. Pipes which stored as a stock at yards, are piled up based on the diameter, material, or manufacturer. Those pipes are manufactured and delivered by mills, and stored at yards until a request comes from wells (e.g., locations where the oil and gas are produced). The pipes are periodically counted by an inventory manager or staff to grasp the number of inventory and for audit purposes. In related art implementations, the pipe count is conducted by humans that look at the end or the cross section of the piles of pipes. The pipes are identical in that view and hundreds of them are piled up in a stack. The errors in the inventory count can occur due to the human perception error, typographical errors, or human memory limitations. Therefore, Information Technology (IT) support or robotic automation should be utilized in the field. The position of the pipe stack is typically assigned at a place with a designated number in the yard. The forklift operator who delivers pipes and conducts pipe pickup will make such determinations based on the number assigned or position in the yard. The length, diameter, and materials of the pipe stack also vary with the customer needs and the capacity of the yard. Further, some of the pipes may be new, whereas others are returned from wells and stored at a yard.

Example implementations involve real-time inventory visibility by using data capture, data preparation, and data analytics of a pipe stack to count and identify the pipes accurately. The example implementations described herein also involve the inventory position by utilizing the position of the data capture media and/or subject, and the direction of the media and/or subject. Example implementations provide the position of the inventories with the image, the analysis, and the number of assets as a result of the analysis. Example implementations also provide the number of inventories that are supposed to be at a given position, and utilize such data as to obtain higher accuracy for data analytics. The example implementations also provide the counting methodology using a bounding box estimation that can be calculated without precise circular detection in the analytics. Considering the geometric constraints of the pipes to correct the count number is another aspect to compensate for errors in pipe detection is also described in example implementations herein.

The typical pipe stacks are located outside and the pipes are not aligned at the end. The lighting condition varies in time and occlusion due to the environmental conditions; however, models developed for analytics in related art implementations cannot cope with the variety of conditions, which causes the degradation of the accuracy of the pipe count. Example implementations solve such problems by offering the expected number of the inventories and use the numbers to optimize the calculation in analytics.

Aspects of the present disclosure involve a management server configured to manage a plurality of pipe stacks, the management server involving a processor, configured to receive global positioning satellite (GPS) position, direction and distance information associated with one or more images of a pipe stack from the plurality of pipe stacks; determine a corresponding pipe stack from the plurality of pipe stacks from the GPS position, direction, and distance information; and determine a count of the corresponding pipe stack from the associated one or more images.

Aspects of the present disclosure involve a computer program for a management server configured to manage a plurality of pipe stacks, the instructions configured to receive global positioning satellite (GPS) position, direction and distance information associated with one or more images of a pipe stack from the plurality of pipe stacks; determine a corresponding pipe stack from the plurality of pipe stacks from the GPS position, direction, and distance information; and determine a count of the corresponding pipe stack from the associated one or more images. The instructions may be stored on a non-transitory computer readable medium configured to be executed by one or more processors.

Aspects of the present disclosure involve a method for managing a plurality of pipe stacks, the method involving receiving global positioning satellite (GPS) position, direction and distance information associated with one or more images of a pipe stack from the plurality of pipe stacks; determining a corresponding pipe stack from the plurality of pipe stacks from the GPS position, direction, and distance information; and determining a count of the corresponding pipe stack from the associated one or more images.

Aspects of the present disclosure involve a system for managing a plurality of pipe stacks, the system involving means for receiving global positioning satellite (GPS) position, direction and distance information associated with one or more images of a pipe stack from the plurality of pipe stacks; means for determining a corresponding pipe stack from the plurality of pipe stacks from the GPS position, direction, and distance information; and means for determining a count of the corresponding pipe stack from the associated one or more images.

Aspects of the present disclosure can involve a device configured to capture one or more images, the device involving one or more sensors configured to capture one or more images of a pipe stack; and a processor, configured to provide GPS position, direction and distance information with the one or more images of the pipe stack to a management server; and receive a count of the pipe stack from a management server in response.

Aspects of the present disclosure can involve a system configured to manage a plurality of pipe stacks, the system involving a device configured to capture one or more images, the device having one or more sensors configured to capture one or more images of a pipe stack from the plurality of pipe stacks; and a first processor, configured to provide global positioning satellite (GPS) position, direction and distance information with the one or more images of the pipe stack to a management server; and receive a count of the pipe stack from the management server in response and the management server, having a second processor, configured to receive the global positioning satellite (GPS) position, direction and distance information associated with one or more images of the pipe stack from the plurality of pipe stacks from the device; determine a corresponding pipe stack from the plurality of pipe stacks from the GPS position, direction, and distance information; and determine the count of the corresponding pipe stack from the associated one or more images.

BRIEF DESCRIPTION OF DRAWINGS

FIGS. 11(a) to 11(c) illustrates example management information that can be utilized in example implementations described herein.

DETAILED DESCRIPTION

Figure 1:
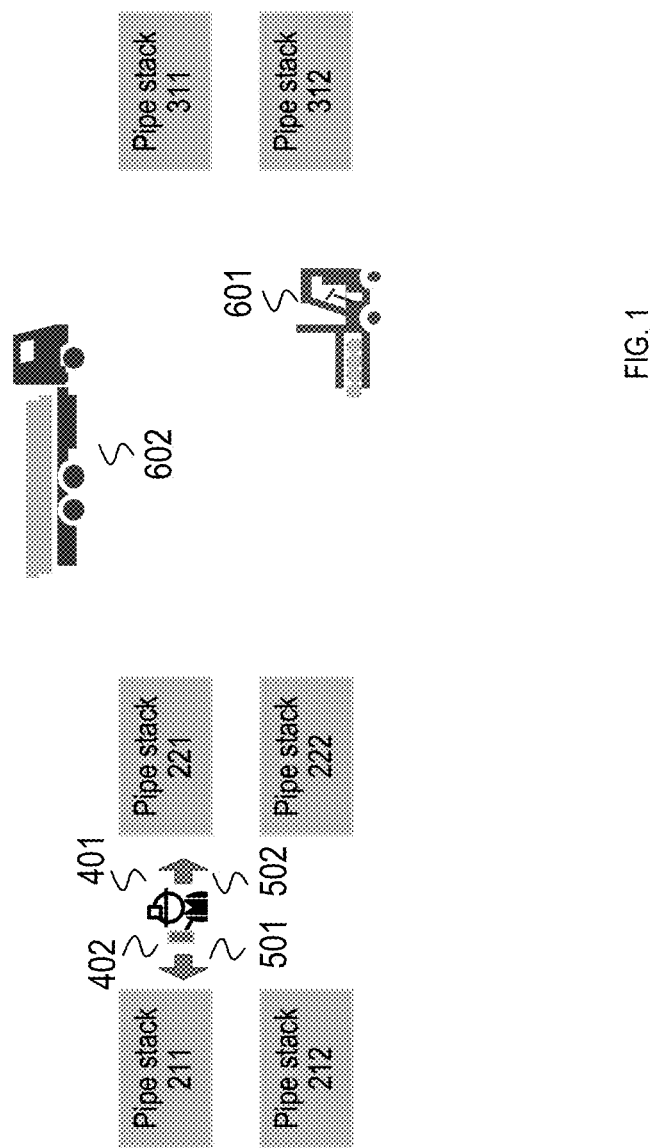
FIG. 1 illustrates an example environment for pipe stacks in a yard, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an inventory counting method, computer program and system, which involves data capture media, data preparation software to analyze the data, algorithms to detect the inventory, and models learned and developed from similar images to capture the object, locate the position of the objects (inventories) by the position of the data capture media or the subject of the data capture (e.g., location of field operator taking the photo) and the direction from the media or the subject. The distance can be used to locate the position from the media to the objects.

Example implementations involve recording the images and analytical results with the position, the position and the direction, or the position, direction, and the distance between the media and the subject with time stamp. Example implementations then extract the expected number of the subject inventories as obtained from an asset management data base, wherein the last analysis result refers to the position, or the position and the direction, and compares the data with result of the analytics, or calculates based on the number loaded and unloaded at the position. The record data with the analytics can include the number, the diameter, the manufacturer of the inventory along with any results of the analysis, in accordance with an example implementation.

The position can determined by GPS, and/or through using a reference mark to identify the position. The direction can be acquired through geomagnetic sensors, gyroscopes, and/or accelerometers which are configured to provide an output of North/East/West/South and in-between directions. The distance between the object (e.g., inventories) and the media (e.g., camera) or the subject (e.g., field operator who take photos) is measured using the depth sensor, which transmits the signal and receive the signal reflected from the object. Another method to measure the distance is to identify the number of pixels. The method helps in estimating the size of the pipes and can determine the difference between a pipe stack nearest to the subject or camera (e.g., the target object/inventory to be evaluated) and a pipe stack from a far distance (e.g., as captured through happenstance).

Example implementations apply algorithms to recognize the number of inventory by extracting the contour of the inventory cross section (e.g., circular detection algorithm of a pipe, Hough transform algorithm). The total number can be counted by the cross section/surface area of the stack and each inventory. The extraction of circumference of the stack and idea of tessellation can help with determining the estimation of the number. To extract the circumference of the stack, the method of image capture can be different from a regular camera in example implementations, because the requirement of the edge detection of the pipe and the circumference of the stack is different. Example implementations can focus on the difference between the metal (pipe) and environment (air); thus, not only can different algorithms can be utilized, but also the media to capture the inventory can be different (infrared (IR), laser, etc.). Combining such algorithms and/or media to capture helps improve the accuracy. The detection algorithm itself can thereby utilize any method in accordance with the desired implementation.

Use two images of the cross-section of pipe stacks (front and back) to enhance the accuracy of the detection and the recognition by referring the position of the pipe stack with the above-mentioned method (the position, the direction, the distance) to identify the pipe stack as the same one.

The threshold can be set in the circular extraction process and the number can be decided by checking if the extracted circles are physically reasonable or not. The physical means the analytical results of the pipe should not be overlapped and/or the pipes should be within the rack size. In the present disclosure, example implementations are described with respect to the pipe count for oil and gas at a yard, but can be extended to other types of inventory or environments in accordance with the desired implementation.

The position of the inventory cannot be located by the image of the pipe stacks without the position of the data capture media. The direction of the media to point the object is utilized in example implementations to locate the position, because the position alone cannot localize the inventory position. FIG. 1 illustrates an example environment for pipe stacks in a yard, in accordance with an example implementation. For example, to locate the position of the pipe stack, the position of the image capture subject (e.g., field worker 401) or device (e.g., camera 402) and the direction 501, 502 to point the object is utilized. Grasping the position of the image data is important to locate the position of the inventory in asset management perspective, and the position data is utilized to extract the expected number of the inventory for the data analytics. The details of the operation at yard are described in further detail below.

The pipes stacked at a yard, unlike pipes stacked at a warehouse or stored at mills, are not aligned ideally at the ends because the pipes are stacked by a forklift. A yard is typically located outside so the lighting condition varies by the season, date, and time. The conditions will cause occlusion at the end of the pipes and shadows in some areas of the pipe end, and such areas cannot be easily located in advance. The condition makes analytics difficult and causes error in pipe detection and counting. Example implementations described herein facilitate the analytics by giving the expected number of the results of the analytics.

An example of the operation at a yard can be as follows. Pipes are delivered by a truck 602 from a mill or a well (e.g., in a case of rig return) to a yard with a delivery slip. The consignee checks the pipes by comparing the objects and the delivery slip. The pipes are then delivered by a forklift 601 to a location 211, 212, 221, 222, 311, or 312 assigned by the yard to store. An asset manager checks the number of the pipes periodically to grasp their inventories and for audit purposes. The manager checks the number, the manufacturer, and visual conditions by comparing with the expected number obtained from the asset management data base. The length of the pipes is sometimes adjusted based on an order, while they are at the yard. The pipes are checked by the manager upon a request or an order from a customer and delivered to the customer based on the requirements. Extra pipes for each work flow are set and are delivered or stocked so as not to fall short of the customer requirements resulting from the discrepancy of the asset registered data at the yard and the actual inventories.

Figure 2:
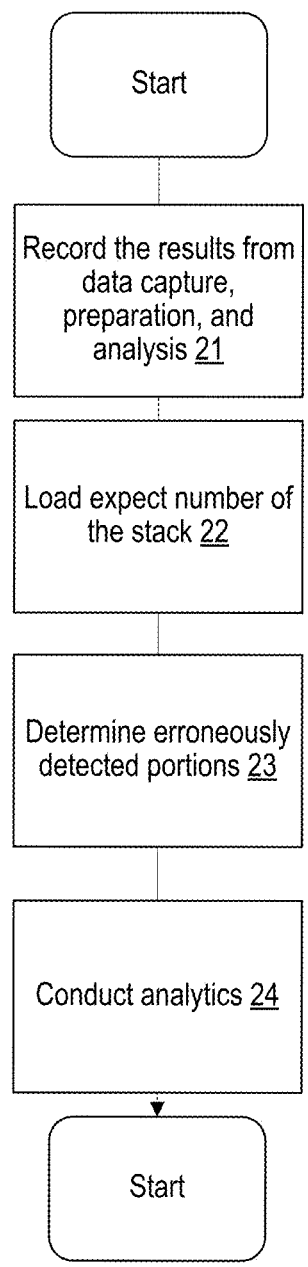
FIG. 2 illustrates an example flow diagram for the system in accordance with an example implementation.

FIG. 2 illustrates an example flow diagram for the system in accordance with an example implementation. At 21, the process involves recording the results from the data capture, preparation and analysis. This process can include information regarding the position, or the position and direction of the device, as well as a time stamp. The preparation and analysis can be involve determining the number of inventory, the type of inventory, the manufacturer, metal, and diameter of inventories.

At 22, the process loads the expected number of the stack based on the position or the position and direction, and the time stamp, compares the expected number from the stack with the results of the analysis, and provides the difference between the expected number and the analysis (e.g., the number, type, manufacturer, metal, diameter of inventories)

At 23, the process locates areas that could involve erroneous detection, and compensates for the analytics. Such compensation can include the transmission of instruction to conduct data capture on a particular area more quickly, the application of analytics with different parameters that are focused on the area considered to be erroneous, and/or use images that provide the part more clearly depending on the desired implementation.

At 24, the process conducts analytics in accordance with the desired implementation. In example implementations, there can be two types of analytics that can be applied. Further, algorithms for detecting the edges can be implemented in any method according to the desired implementation.

In a first type of analytics, there is pipe detection, which can be conducted based on shape and related position, and or related contents. For example, the pipe detection can involve detecting the edge of the pipes and determining the center position and diameter for each of the pipes. In another example, color images of the cross-section casing are utilized, wherein feature extraction is conducted. As an example, each manufacturer has its own color casing and tag attached to the casing (e.g., bar code, QR code). Example implementations utilizing color images can thereby conduct recognition on the manufacturer, diameter, and material based on those information registered in a data base from image processing on the color casing and/or the tag.

In example implementations, thresholds can be utilized to define the circles as well as the number of assets to be detected. Such thresholds can be set based on the physical consistency and the stack boundary.

In a second type of analytics, there is pipe stack outline detection, which can be conducted through calculating the number based on the outline of the stack and the diameter extracted by the pipe detection, or from any database that stores information regarding the pipe diameter in accordance with the desired implementation. The data capture method may vary for each type of analytics. For pipe stack detection, IR or laser can be used in accordance with the desired implementation.

Figure 3:
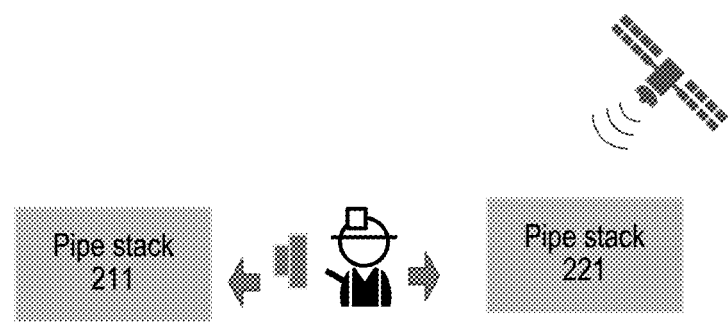
FIG. 3 illustrates an example of position and direction of the device being utilized to determine whether the images being captured is related to pipe stack 211 or pipe stack 212, in accordance with an example implementation.

In the example implementations, the information that can be utilized can involve the position of the device capturing the inventory assets, the direction of the device, and the distance of the device from the inventory assets. FIG. 3 illustrates an example of position and direction of the device being utilized to determine whether the images being captured is related to pipe stack 211 or pipe stack 221, in accordance with an example implementation. The position can be located with signals from GPS, the cellular base station, wireless local area network (WLAN) by trilateration or by any other method in accordance with an example implementation. In other example implementations, an accelerometer can be used when signals from those position sensors cannot be received. A reference mark can be used to or assist in identifying the position. The direction can be acquired through a geomagnetic sensor/gyroscope/accelerometer as an output of North/East/West/South and in-between directions. The distance between the object (e.g., inventory/pipes stack) and the media device (camera) or the subject (e.g., field operator who take photos) can be measured by a depth sensor which transmits the signal and receive the signal reflected from the object. The function of the depth sensor can be achieved with an image capture unit and an image processing unit by measuring the pixel size of the object.

In the flow of 22, the expected number of the stack position can be used with the number from the last analytical results, the number stored at the asset management data base, or the number calculated by the last analytical results plus the difference between the loaded pipes at the position with the unloaded pipes at the position. If the number is calculated based on the difference between loaded and unloaded pipes, the time stamp of the image capture, and the loading or unloading can be utilized to identify the time sequence. To identify the number of the loading and unloading pipes at the position, the forklift includes a function to identify the number and loading and unloading (e.g., as maintained in a schedule). The number recognition can be done with the image capture and analytics. The weight sensor also helps to identify if the forklift load or unload the pipes. The recognition of the number of the pipes at the truck can also be utilized as a source of information to match the number distributed by forklifts and pipe stacks. The loading/unloading activities can have the time stamp and positional data to identify the flow of the pipes.

Figure 4:
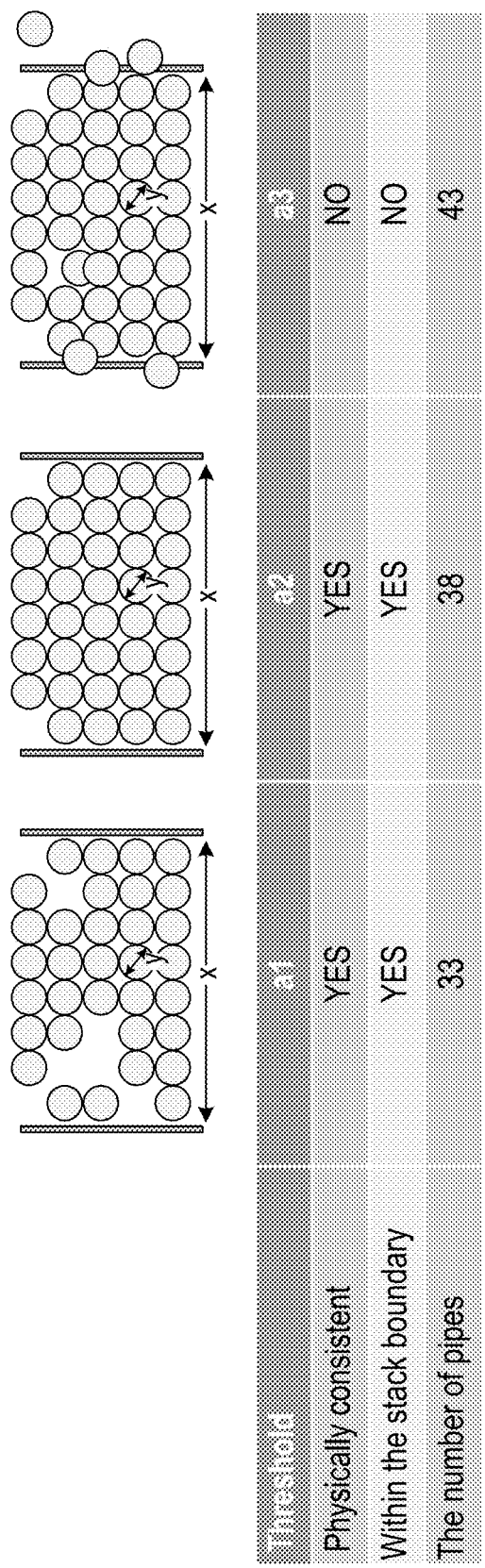
FIG. 4 illustrates an example of the utilization of thresholds for the pipe stack count with parameters, in accordance with an example implementation.

In the flow of 24, one type of analytics to be conducted is accuracy improvement by utilizing thresholds for the data analytics. For example, to extract the circle from the cross section of the pipes, a threshold can be set. The threshold can be defined so that the number of the circles would be maximized so long as the extracted circles are physically reasonable and/or fit the stack size. FIG. 4 illustrates an example of the utilization of thresholds for the pipe stack count with parameters, in accordance with an example implementation. As illustrated in FIG. 4, such parameters can include whether the pipe stack is physically consistent, whether pipes are within the stack boundary, and the number of expected pipes. Example implementations provide the expected number of the pipes at the position as loaded from the asset management data base or from the result of the last analytics at the position. For example, the threshold can be set so that the number analyzed by the algorithm and the expected number to be equal, whereupon the circles extracted by the algorithm are checked to determine whether such circles are physically reasonable or not in view of the location. Such information can assist in optimizing the threshold or showing the possible area of missing pipes through analytics and guide the data capture subject to take clearer images of the ambiguous or erroneous areas.

The extracted number of the pipes at a location is detected and calculated, which can includes the series of data capture, data preparation and data analytics including correction. The expected number at the location can be calculated with the results of the last extracted number, the number additionally stacked at the position, and the schedule of delivery from the stack with date, time and location, (e.g., "the latest expected number"="the number calculated by the last analytics"+"the number stacked by a forklift after the last analytics"−"the number delivered from the stack after the analytics"). A camera or number counting method at a forklift can also be utilized to set the number delivered to and from the stack. The other methods to set the expected number can involve utilizing the number by the conventional human visual count or taking many images to enhance the accuracy of analytics.

Figure 5:
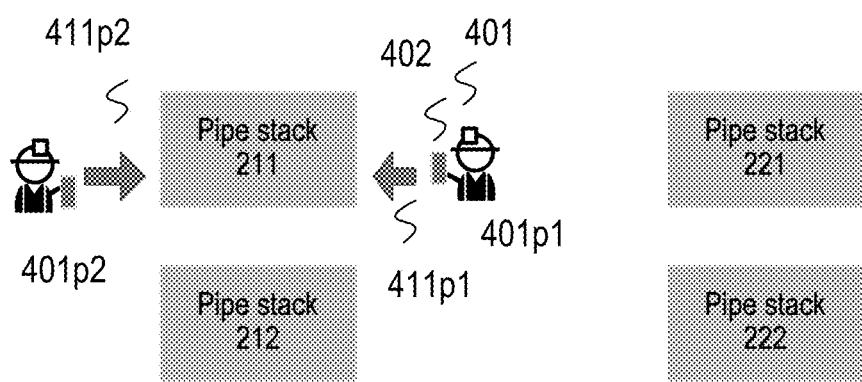
FIG. 5 illustrates an example of a two side image capture referring to the pipe stack position, in accordance with an example implementation.

FIG. 5 illustrates an example of a two side image capture referring to the pipe stack position, in accordance with an example implementation. In example implementations, utilizing two images of the cross-section of pipe stacks (front as taken from direction 411*p*2 and back as taken from direction 411*p*1) can enhance the accuracy of the detection and the recognition by referring to the position of the pipe stack with the above-mentioned method (the position, the direction, the distance) to identify the pipe stack as being the same. This approach can be effective because it can be possible to evade the occlusions (e.g., if the lengths of the pipes are same or the similar, the hidden pipe at one end means sticks out at the other end), and the lighting can be different between the photo from the position of 401*p*1 and 401*p*2.

The recognition of the casing helps not only to identify the manufacturer, but to apply the model trained by the similar training data. The special features for each casing also helps to recognize the pipe with circular detection.

Figure 6:
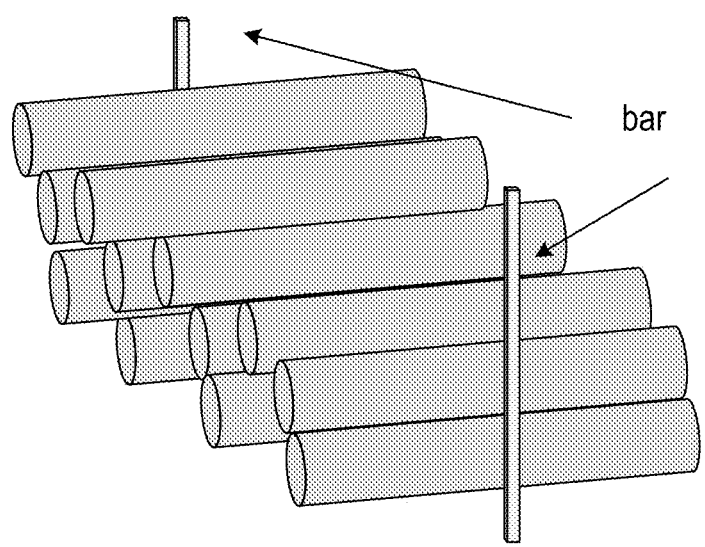
FIG. 6 illustrates an example of a pipe stack, in accordance with an example implementation.

In another type of analytics in the flow of 24, there is a counting method/bounding box estimation of a pipe stack. Such example implementations identify the number of the pipe in a stack by recognize the external form of the stack and the center and diameter of the pipes. FIG. 6 illustrates an example of a pipe stack, in accordance with an example implementation. As illustrated in FIG. 6, the pipes may be misaligned at the ends, which can cause occlusion depending on the environmental conditions. In such situations, it may not be trivial to extract the circles of the pipes, however, the total number can be calculated if the system can capture certain parameters, including the outline of the stack, diameter of the pipes, the most outer/external pipes, the most possible number of the vertical and horizontal pipes, and the length of the horizontal and vertical direction of the stack. The diameter can vary by the distance from the stack when conducting the image capture, but the diameter can be calculated correctly with a reference which works as a scale in the image. In example implementations, such estimation (e.g., bounding box estimation) can be more accurate if the diameter of the pipes is the same and the number of pipes in a layer is the same.

Figure 7:
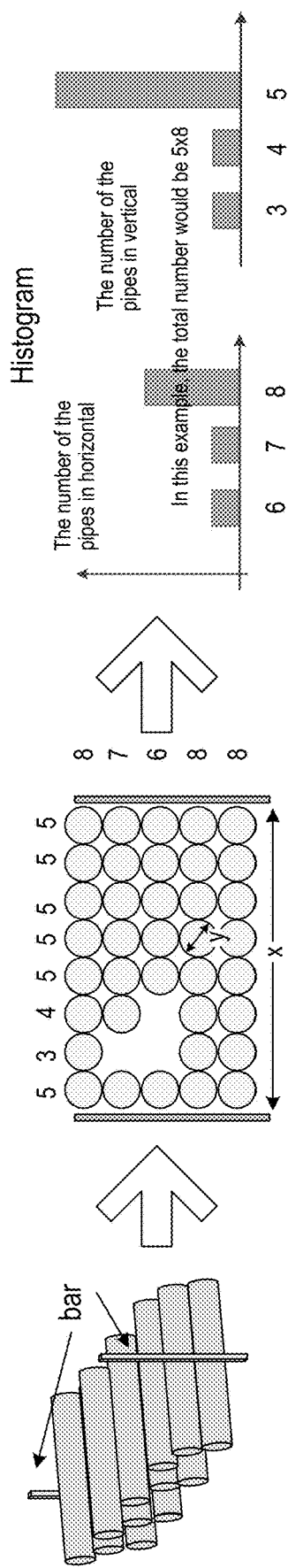
FIG. 7 illustrates an example of a processing to determine a cross section (square packing), and conducting a histogram on a cross section, in accordance with an example implementation.

As illustrated in FIG. 6, a stack can be confined by bars as shown. Because the distance between the bars is usually standardized at each yard and the diameter of the pipe is also standardized, the system can thereby calculate the number of the pipes in horizontal direction. FIG. 7 illustrates an example of a processing to determine a cross section (square packing), and conducting a histogram on a cross section, in accordance with an example implementation. Further, the highest possible number of the horizontal layer can be counted by conducting video analytics/circular detection and selecting the highest number detected. Example implementations further use the histogram to select the most probable number. The outliers are eliminated by the histogram approach. The vertical number can be calculated if the analytics can tell the top and bottom position of the stack, or from the top position only (with the diameter). The number of the higher layer can be less than the lower layer. Further, the top layer can be less than the layer in the middle. The recognition of the pipe diameter can be done not only by the image capture and circular detection, but also through other implementations (e.g., a purchase order record, the process in loading by forklift, etc.) in accordance with the desired implementation. The combination of the bounding box estimation method and circular detection for each tube can also be applicable.

The systematic approach to realize the above-mentioned implementations is to focus on the edge of the stack when capturing the images and/or the analytics. The media to take the images also varies from camera to other devices such as IR camera or laser. The algorithmic approach is to adjust the images at the preprocessing stage so as to emphasize some portions like the edge pipes or lines of pipes clearly taken so as to detect the circle more easily. Example implementations can also apply more contrast to the background as applicable to detect the stack as one object. The number of the pipes can be calculated using the diameter of the pipes and the cross section of the stack. The diameter can be extracted using the same image data or any other documents for the inventory.

Figure 8:
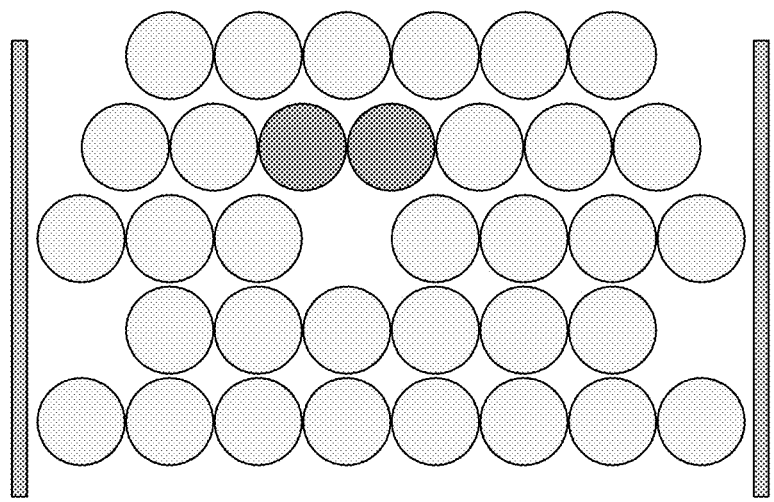
FIG. 8 illustrates an example result from video analytics from a pipe stack that is in the form of hexagonal packing, in accordance with an example implementation.

FIG. 8 illustrates an example result from video analytics from a pipe stack that is in the form of hexagonal packing, in accordance with an example implementation. Example implementations involve a compensation method to compensate for misdetection of pipes. The area of misdetection can be defined with geometric constraints. The geometric constraints can indicate, for example that one pipe on top must be supported by two pipes underneath (or one pipe and bar for the pipe located on the edge) as shown in the hexagonal packing structure of FIG. 8. The shaded circles on the second layer from top are not supported by two circles underneath. Accordingly, the result indicates that one circle is missing in the third layer in the middle.

Figure 9:
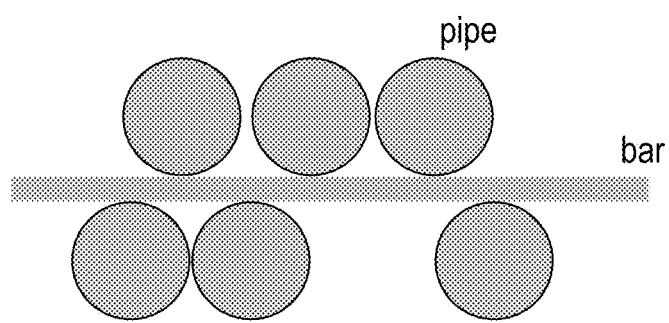
FIG. 9 illustrates an example of the pipe stack with an insertion bar, in accordance with an example implementation.

FIG. 9 illustrates an example of the pipe stack with an insertion bar, in accordance with an example implementation. There are cases where the bars are inserted between each layer of pipes as shown in FIG. 9. This approach is common for the wide-diameter heavy pipes. In this case the above-mentioned estimation is not applicable, however, the circular object on a bar should be aligned accordingly and has less chance to be stabilized in that manner. In example implementations, one of the ways to analyze the existence of the insertion bars is to check the alignment of the pipes in vertical way. If the analysis recognizes the pipes are aligned vertically (thereby indicating that there is an insertion bar), example implementations can thereby eliminate the assumption that the one pipe is supported by the two pipes underneath.

To calculate the diameter or the position of each tube, there may be residual error that needs to be addressed. The circular detection technique indicates the diameter and the center of the pipe, but the end of the pipes may not necessarily be aligned, and thus the relative diameter can be different. The absolute diameter in the images varies by the distance of the image capture from the stack as well. The cross section may not be always circular; for example, the shape can be oval due to the angular shooting by a camera. Such diameter margins are thereby also taken into account and accounted for by using the information of the camera height and/or angle of the image capture with sensors.

Figure 10:
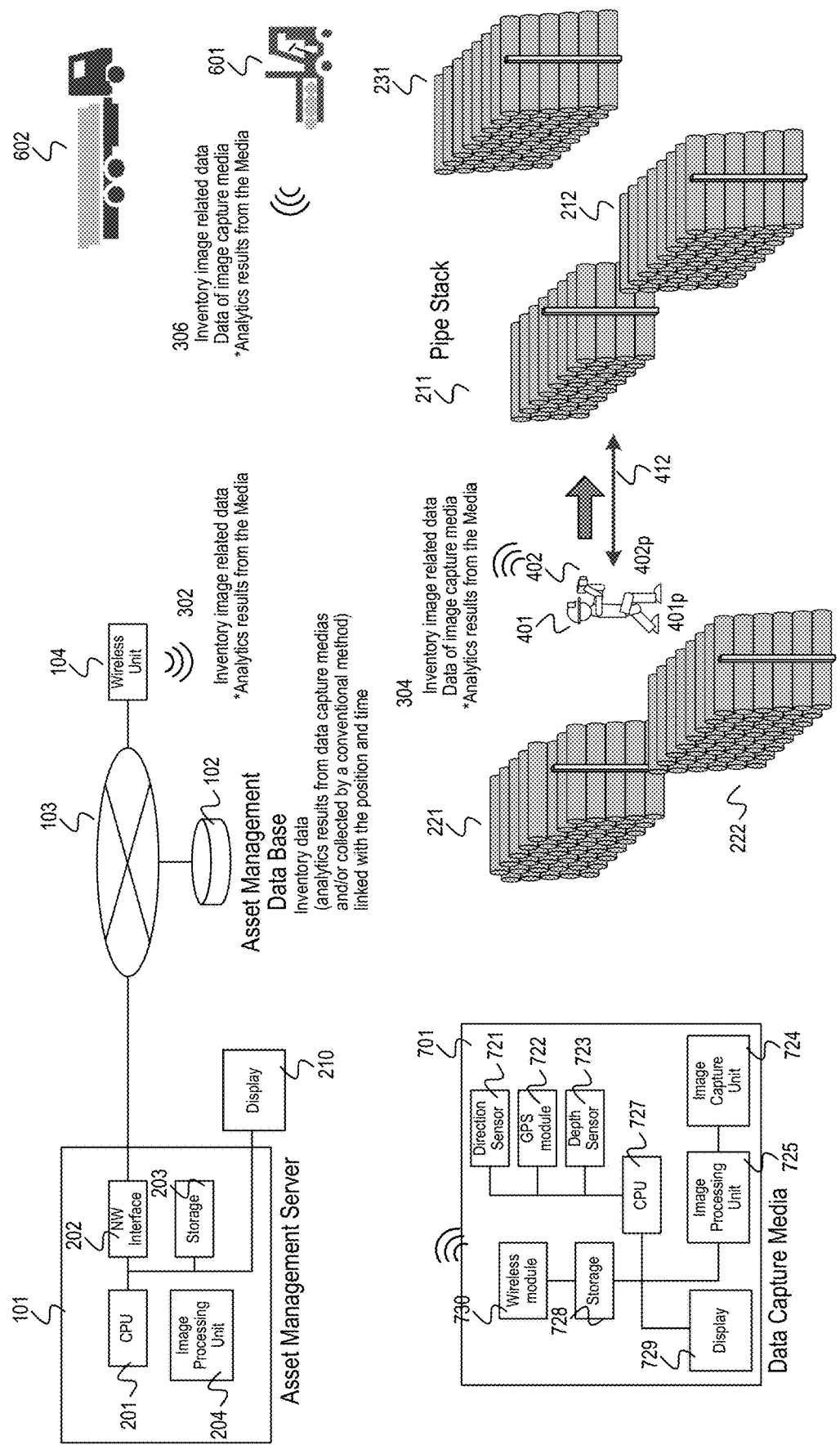
FIG. 10 illustrates an example system diagram upon which example implementations may be applied.

FIG. 10 illustrates an example system diagram upon which example implementations may be applied. A data capture subject (401) who is a field manager/operator or which can be a robot, use a data capture media/device/apparatus (402) such as a camera, smart phone, or tablet to take images of pipe stacks (211, 212, 221, 222, 231).

The media (402) as illustrated in functional diagram of data capture media (701) can involve a direction sensor (721), which measures the direction of the media, GPS module (722) which receives the signal from satellites and locates its position by trilateration, a depth sensor (723) which measure the distance from the object (inventory) to the subject (401) or media (402), an image capture unit (724) which take the image of the object (inventory), an image processing unit (725) to prepare, process, and analyze the data from the image capture unit (724), a central processing unit (CPU) (727), a storage (728) that functions as memory configured to store various kinds of data and programs, a display (729) to show the data and the results to the subject (401) (e.g., display the analysis results, the expected number of the inventories, an advice to take a photo to provide better detection accuracy and so on) by the programs, and a wireless module (730) which send and receive the data. The function of the depth sensor (723) can be facilitated by an image capture unit (724) and an image processing unit (725) by measuring the number of the pixels of the object. Images from image capture unit (724) are processed in the image processing unit (725) by applying a model to extract the feature of the intent (a circle for the pipe count).

In example implementations, the feature extraction model is developed prior to the analytics by using similar and various kinds of images as training data set. A program in the image processing unit (725) is configured to count the number of the inventories. Depending on the desired implementation, the data capture media (701) can include all the components as illustrated in FIG. 10, or can be external to the image processing unit (725). In an example implementation involving a image processing unit (725), such implementations can be facilitate as edge processing that utilizes computing power, so the data capture media (701) can be a tablet type of computer. In an example implementation of a data capture media (701) involving an external image processing unit (725) such as a regular camera, the images are sent to an asset management server (101) to rely on the function at image processing unit (204).

The function of defining the direction, the position, and the distance by the direction sensor (721), the GPS module (722), the depth sensor (723) can be offered by the data capture subject (401). The data from data capture media (701) can be (a) inventory image related data, which includes image data (e.g., photos of a pipe stack) and time stamp (ex. 12:05:03, Dec. 25, 2018), (b) data of image capture media, which are the position (402p) of the data capture media (402), the direction (411) of the data capture media (402), the distance (412) between the image capture media (402) and a pipe stack (211 for example), and the media identification number to identify the image capture media (402), (c) analytics results from the image capture media (402), which are the number and the type of inventory. The required data mentioned above (302, 304, 305) are sent among the image capture media (402), the forklift (601), and the asset management data base (102). A forklift (601) deliver the pipes from a truck (602) to a pipe stack (211, 212, 221, 222, 231) and from a pipe stack (211, 212, 221, 222, 231) to a truck (602), which can also have the similar configurations and functions as the data capture media (402).

An asset management server (101) can involve a CPU (201), a network (NW) interface (202), a storage (203), and an image processing unit (204). The image processing unit (204) can have more computing power compared to the image processing unit (725) at the data capture media (701), because the latter is operated by battery and is in the form of a mobile device. The server (101) can be connected to a display (210) to show the data and analytics results. The server (101) is connected to a wireless unit (104), and asset management data base (102) through a network (103), tethered directly or included as a hardware. The database (102) stores inventory image related data, data of image capture media, and analytics results from the media (402, 601) or asset management server (101). Such data can be gathered by any method in accordance with the desired implementation. The data can be linked with the position of the pipe stack or the position of the image capture media (402) and the time of the image capture. CPU (727, 201) can be in the form of physical hardware processors, or a combination of hardware and software processors in accordance with the desired implementation.

FIGS. 11(a) to 11(c) illustrates example management information that can be utilized in example implementations described herein. Specifically, FIG. 11(a) illustrates example information that can be included with one or more images transmitted by data capture device (402), which can include image ID information, GPS position information, direction information, distance information, image data, and time stamp. Image ID information indicates the ID for the image being transmitted. GPS position information can indicate the GPS position of the operator of the data capture device (402), or of the data capture device (402) itself, in accordance with the desired implementation. Such GPS information can be in the form of GPS coordinates, or otherwise depending on the desired implementation. Direction information can indicate the direction of the data capture device (402) when the image was captured, and can be in the form of compass direction (e.g., north, northwest), 360 degree direction, or otherwise depending on the desired implementation. Distance information can indicate the distance from the pipe stack as measured from depth sensors of the data capture device (402) and can be in the form of any distance (e.g., meters, centimeters, etc.) in accordance with the desired implementation. Image data can include the data of the image that is captured in accordance with any desired format. Timestamp can indicate the time in which the image was captured.

FIG. 11(b) illustrates an example of management information stored in storage (203) of the asset management server (101) as retrieved from asset management data base (102), and/or as managed in asset management data base (102) in accordance with the desired implementation. The management information can include pipe stack ID, GPS coordinates, expected count, configuration type, and threshold parameters. Pipe stack ID indicates an identifier associated with a pipe stack, and can be a code or ID as embedded in a QR code, a bar code, a sign designating a pipe stack, a serial number, or other methods in accordance with the desired implementation. GPS coordinates can indicate the coordinates of the middle of a corresponding pipe stack, a sign or other indicia indicative of the pipe stack, or otherwise according to the desired implementation. The expected count is the count managed by the asset management server (101) based on transactions that have been made to the corresponding pipe stack as illustrated in FIG. 11(c), and from previous analytics on previous images received regarding the data capture media 701. Configuration type can indicate the type of pipe stack configuration associated with the pipe stack, which can include, but is not limited to, hexagonal packing, stack with insertion bar, and so on in accordance with the desired implementation. Threshold parameters are thresholds set for conducting analytics on the pipe stack, which can include the thresholds as illustrated in FIG. 4.

FIG. 11(c) illustrates an example of management information for transactions as received by the asset management server (101) as retrieved from a forklift (601), a truck (602) or other entities that conduct transactions with pipe stacks managed by the asset management server (101) in accordance with an example implementation. The management information can include the pipe stack ID, the transaction conducted, and the timestamp. Pipe stack ID indicates an identifier associated with a pipe stack, and can be a code or ID as embedded in a QR code, a bar code, a sign designating a pipe stack, a serial number, or other methods in accordance with the desired implementation. Transaction can include information regarding the alteration of pipes in the pipe stack, such as the adding of pipes, removal of pipes, cutting of the lengths of pipes, and the number of pipes affected in accordance with the desired implementation. Timestamp can indicate the time that the transaction occurred. Such management information can be provided from the forklift (601), truck (602) or other entities in any manner according to the desired implementation (e.g., through an application in a mobile device or in the entity, through submission of logs that are entered into the database, and so on).

As illustrated in FIG. 10, example implementations can involve a system configured to manage a plurality of pipe stacks, the system involving a device (402, 701) configured to capture one or more images, the device involving one or more sensors (724) configured to capture one or more images of a pipe stack from the plurality of pipe stacks; and a first processor (727), configured to: provide global positioning satellite (GPS) position (e.g., determined from GPS module 722), direction (e.g., determined from direction sensor 721) and distance information (e.g., determined from depth sensor 723) with the one or more images of the pipe stack to a management server such as asset management server (101), which can be in the format of information as illustrated in FIG. 11(a) and provided through transmission over wireless module (730) to be received by wireless unit (104); and receive a count of the pipe stack from the management server in response, which indicates the number of pipes in a corresponding pipe stack to a display (729) of the device (402, 701) as provided with inventory image related data (302).

The system can also involve a management server such as asset management server (101) which can involve a second processor (201), configured to: receive the global positioning satellite (GPS) position, direction and distance information associated with one or more images of the pipe stack from the plurality of pipe stacks from the device (402, 701) as received through wireless unit (104). An example format of such information is provided with respect to FIG. 11(a), which may be stored in storage (203) and then later to the asset management data base 102. Second processor (201) can also be configured to determine a corresponding pipe stack from the plurality of pipe stacks from the GPS position, direction, and distance information based on comparing the GPS position to GPS coordinates as illustrated in FIG. 11(b), determining the corresponding pipe stacks from the management information of FIG. 11(b) having GPS coordinates within a threshold distance to the GPS position as determined from the distance information, and identifying the corresponding pipe stack from the corresponding pipe stacks based on the direction of the device (402, 701). Second processor (201) can be configured to determine the count of the corresponding pipe stack from the associated one or more images through the process as described in FIG. 2, and as further described in FIGS. 3-9.

In an example implementation, the second processor (201) can be configured to determine an expected count for the corresponding pipe stack as described in FIG. 2 and as retrieved from management information of FIG. 11(b); and provide instructions to the device based on the expected count, the instructions indicative of another position and direction for the device to take additional images of the corresponding pipe stack. As an example, if the expected count does not match the determined count, then instructions may be provided to change the position and direction as illustrated in FIG. 5. In such an example, if the initial images were taken at 401p2 at direction 411p2, then instructions can be provided to move the device to the position 401p1 at direction 411p1 in accordance with any desired implementation (e.g., in the form of GPS coordinates and direction for device, instructions on the display of the device 402, etc.)

In an example implementation, the second processor (201) is further configured to transmit the expected count to the device (701, 402) as retrieved from management information as illustrated in FIG. 11(b), and transmitted over wireless unit (104).

In an example implementation, storage (203) can be configured to manage management information for the plurality of pipe stacks, the management information indicative of transactions made to each of the pipe stacks as illustrated in FIG. 11(c). The management can be conducted by storing the management information in asset management data base (102) and retrieving it into storage (203) and updating asset management data base (102) when a corresponding pipe stack ID undergoes a transaction. The management information can also associate each of the plurality of pipe stacks to GPS position as indicated by GPS coordinates of FIG. 11(b), wherein the second processor (201) is configured to determine the corresponding pipe stack from the plurality of pipe stacks from the GPS position, direction, and distance information based on the management information as described herein.

Second processor (201) can be configured to determine the count of the corresponding pipe stack based on identifying physical sides of the corresponding pipe stack and identifying one or more of gaps and overlaps from the one or more images as illustrated in FIG. 4 and FIG. 7. In an example implementation, gaps in the middle of the stack can be determined to contain a pipe based on the type of pipe alignment, and overlaps can be discounted in accordance with the desired implementation.

Second processor (201) can be configured to determine the count of the corresponding pipe stack based on one or more thresholds set according to a type of pipe alignment associated with the corresponding pipe stack as illustrated in FIG. 7 and FIG. 8. In an example involving a square packing type of pipe alignment, the process used to count the pipe stack as described in FIG. 7 can be utilized. In an example involving a hexagonal packing as illustrated in FIG. 8, the process to count the pipe stack as described in FIG. 8 can be used. Such processes can be adjusted to the desired pipe alignment in accordance with the desired implementation.

Example implementations described herein can be applied to any inventory management, which requires the position of the inventory. The bounding box approach including bounding box estimation and the combination of the estimation with individual inventory detection can be applied to any inventory recognition. Example implementations can fit to applications where the features of the inventory are extracted and where the cross section of the inventory is identical, but is not limited thereto. The examples inventory having identical or semi-identical cross-sections can be sewage pipes, lumber, metal bars, and utility poles. The location of the inventory fits for the large inventories where the position of the inventory is allocated with GPS. In the case of tubular inventory for oil and gas, the location can involve a mill, yard, and storage at well.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management server configured to manage a plurality of pipe stacks, the management server comprising:
   a processor, configured to:
   receive global positioning satellite (GPS) position, direction and distance information associated with one or more images of a pipe stack from the plurality of pipe stacks;
   determine a corresponding pipe stack from the plurality of pipe stacks from the GPS position, direction, and distance information; and
   determine a count of the corresponding pipe stack from the associated one or more images.

2. The management server of claim 1, wherein the processor is configured to:
   determine an expected count for the corresponding pipe stack; and
   provide instructions to a camera associated with the one or more images based on the expected count, the instructions indicative of another position and direction for the camera to take additional images of the corresponding pipe stack.

3. The management server of claim 2, wherein the processor is further configured to transmit the expected count to the camera.

4. The management server of claim 1, further comprising a memory configured to manage management information for the plurality of pipe stacks, the management information indicative of transactions made to each of the pipe stacks.

5. The management server of claim 1, further comprising a memory configured to manage management information for the plurality of pipe stacks, the management information associating each of the plurality of pipe stacks to GPS position, wherein the processor is configured to determine the corresponding pipe stack from the plurality of pipe stacks from the GPS position, direction, and distance information based on the management information.

6. The management server of claim 1, wherein the processor is configured to determine the count of the corresponding pipe stack based on identifying physical sides of the corresponding pipe stack and identifying one or more of gaps and overlaps from the one or more images.

7. The management server of claim 1, wherein the processor is configured to determine the count of the corresponding pipe stack based on one or more thresholds set according to a type of pipe alignment associated with the corresponding pipe stack.

8. A system configured to manage a plurality of pipe stacks, the system comprising:
   a device configured to capture one or more images, the device comprising:
      one or more sensors configured to capture one or more images of a pipe stack from the plurality of pipe stacks; and
      a first processor, configured to:
         provide global positioning satellite (GPS) position, direction and distance information with the one or more images of the pipe stack to a management server; and
         receive a count of the pipe stack from the management server in response;
   and
   the management server, comprising:
      a second processor, configured to:
         receive the global positioning satellite (GPS) position, direction and distance information associated with one or more images of the pipe stack from the plurality of pipe stacks from the device;
         determine a corresponding pipe stack from the plurality of pipe stacks from the GPS position, direction, and distance information; and
         determine the count of the corresponding pipe stack from the associated one or more images.

9. The system of claim 8, wherein the second processor is configured to:
   determine an expected count for the corresponding pipe stack; and
   provide instructions to the device based on the expected count, the instructions indicative of another position and direction for the device to take additional images of the corresponding pipe stack.

10. The system of claim 9, wherein the processor is further configured to transmit the expected count to the device.

11. The system of claim 8, the management server further comprising a memory configured to manage management information for the plurality of pipe stacks, the management information indicative of transactions made to each of the pipe stacks.

12. The system of claim 8, the management server further comprising a memory configured to manage management information for the plurality of pipe stacks, the management information associating each of the plurality of pipe stacks to GPS position, wherein the second processor is configured to determine the corresponding pipe stack from the plurality of pipe stacks from the GPS position, direction, and distance information based on the management information.

13. The system of claim 8, wherein the second processor is configured to determine the count of the corresponding pipe stack based on identifying physical sides of the corresponding pipe stack and identifying one or more of gaps and overlaps from the one or more images.

14. The system of claim 8, wherein the second processor is configured to determine the count of the corresponding pipe stack based on one or more thresholds set according to a type of pipe alignment associated with the corresponding pipe stack.

15. A device configured to capture one or more images, the device comprising:
- one or more sensors configured to capture one or more images of a pipe stack; and
- a processor, configured to:
  - provide Global Positioning Satellite (GPS) position, direction and distance information with the one or more images of the pipe stack to a management server; and
  - receive a count of the pipe stack from the management server in response to the provided GPS position, direction, distance information, and the one or more images.

\* \* \* \* \*